(12) United States Patent
Manadhata et al.

(10) Patent No.: US 10,389,680 B2
(45) Date of Patent: Aug. 20, 2019

(54) DOMAIN NAME AND INTERNET ADDRESS APPROVED AND DISAPPROVED MEMBERSHIP INTERFACE

(71) Applicant: HEWLETT PACKARD ENTERPRISE DEVELOPMENT LP, Houston, TX (US)

(72) Inventors: Pratyusa Kumar Manadhata, Princeton, NJ (US); Amruta Gokhale, Princeton, NJ (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 605 days.

(21) Appl. No.: 15/021,015

(22) PCT Filed: Oct. 30, 2013

(86) PCT No.: PCT/US2013/067540
§ 371 (c)(1),
(2) Date: Mar. 10, 2016

(87) PCT Pub. No.: WO2015/065380
PCT Pub. Date: May 7, 2015

(65) Prior Publication Data
US 2016/0226819 A1    Aug. 4, 2016

(51) Int. Cl.
*G06F 15/177* (2006.01)
*H04L 29/12* (2006.01)
(Continued)

(52) U.S. Cl.
CPC ...... *H04L 61/1511* (2013.01); *H04L 61/2503* (2013.01); *H04L 63/02* (2013.01);
(Continued)

(58) Field of Classification Search
CPC .................................................. H04L 61/1511
(Continued)

(56) References Cited

U.S. PATENT DOCUMENTS

| 6,757,740 B1 * | 6/2004 | Parekh | G06Q 20/3224 |
| | | | 709/245 |
| 7,849,502 B1 * | 12/2010 | Bloch | H04L 29/12066 |
| | | | 726/11 |

(Continued)

OTHER PUBLICATIONS

Extended European Search Report, EP Application No. 13896703.9, dated May 2, 2017, pp. 1-7, EPO.
(Continued)

*Primary Examiner* — Anthony Mejia
(74) *Attorney, Agent, or Firm* — Hewlett Packard Enterprise Patent Department

(57) ABSTRACT

According to an example, domain name and IP address approved and disapproved membership inference may include receiving domain names and IP addresses, and mapping the domain names to the IP addresses. Domain names that belong to an approved domain name list or to a disapproved domain name list may be identified. IP addresses that belong to an approved IP address list or to a disapproved IP address list may be identified. For an unknown IP address and domain names that map to the unknown IP address, a determination is made as to whether more than a predetermined percentage of the domain names that map to the unknown IP address are in the approved domain name list. Based on the determination, the unknown IP address may be designated as approved and assigned to the approved IP address list, or alternatively, designated as disapproved and assigned to the disapproved IP address list.

14 Claims, 5 Drawing Sheets

(51) Int. Cl.
*H04L 29/06* (2006.01)
*H04L 29/08* (2006.01)

(52) U.S. Cl.
CPC .......... *H04L 63/10* (2013.01); *H04L 63/1416* (2013.01); *H04L 67/02* (2013.01)

(58) Field of Classification Search
USPC ........................................................ 709/220
See application file for complete search history.

(56) References Cited

U.S. PATENT DOCUMENTS

| | | | |
|---|---|---|---|
| 8,214,365 B1 | 7/2012 | Manadhata et al. | |
| 8,260,914 B1 | 9/2012 | Ranjan | |
| 8,347,394 B1* | 1/2013 | Lee ................... | H04L 61/1511 726/22 |
| 8,387,145 B2 | 2/2013 | Xie et al. | |
| 8,572,731 B1 | 10/2013 | Oliver | |
| 9,294,435 B2* | 3/2016 | Ivanov ................ | H04L 61/1511 |
| 9,426,049 B1* | 8/2016 | Kalavade ............ | H04L 43/0876 |
| 10,084,791 B2* | 9/2018 | Chien .................. | H04L 63/101 |
| 2004/0073707 A1* | 4/2004 | Dillon ................ | H04L 29/12009 709/245 |
| 2006/0080437 A1 | 4/2006 | Lake | |
| 2007/0204026 A1* | 8/2007 | Berger ................ | G06Q 10/107 709/223 |
| 2008/0104235 A1* | 5/2008 | Oliver ................ | H04L 29/12066 709/224 |
| 2008/0177994 A1* | 7/2008 | Mayer ................ | G06F 9/4418 713/2 |
| 2008/0201401 A1* | 8/2008 | Pugh .................. | H04L 63/1441 709/201 |
| 2009/0113016 A1* | 4/2009 | Sen .................... | G06Q 10/107 709/207 |
| 2010/0030876 A1 | 2/2010 | Perry et al. | |
| 2010/0037314 A1 | 2/2010 | Perdisci et al. | |
| 2010/0161537 A1 | 6/2010 | Liu et al. | |
| 2011/0078309 A1 | 3/2011 | Bloch et al. | |
| 2011/0276716 A1* | 11/2011 | Coulson ............ | H04L 29/12066 709/238 |
| 2011/0283357 A1 | 11/2011 | Pandrangi et al. | |
| 2011/0289168 A1* | 11/2011 | Allam .................... | H04L 51/24 709/206 |
| 2011/0302656 A1* | 12/2011 | El-Moussa .......... | H04L 63/1425 726/24 |
| 2012/0017259 A1* | 1/2012 | MacCarthaigh .. | H04L 29/12066 726/1 |
| 2012/0054860 A1* | 3/2012 | Wyschogrod ..... | H04L 29/12066 726/22 |
| 2012/0089745 A1* | 4/2012 | Turakhia ................ | H04L 63/10 709/245 |
| 2012/0198549 A1 | 8/2012 | Antonakakis et al. | |
| 2013/0179974 A1 | 7/2013 | Manadhata et al. | |
| 2016/0337378 A1* | 11/2016 | Wan ....................... | H04L 63/14 |
| 2018/0261216 A1* | 9/2018 | Leeb ................... | G10L 15/1815 |

OTHER PUBLICATIONS

International Search Report and Written Opinion, International Application No. PCT/US2013/067540, dated Jul. 28, 2014, pp. 1-8, KIPO.

Kevin M. Carter et al., "Probabilistic Threat Propagation for Malicious Activity Detection," Apr. 29, 2013, pp. 2940-2944, IEEE, Available at: <iipl.tk/paper/ICASSP2013/pdfs/0002940.pdf>.

Sandeef Yadav, "Scalable Techniques for Anomaly Detection," A Dissertation, Dec. 2012, pp. 1-139, Texas A&M University, Available at: <cesg.tamu.edu/wp-content//uploads/2012/01/thesis-sandeepy08122.pdf>.

\* cited by examiner

DOMAIN NAME AND INTERNET ADDRESS APPROVED AND DISAPPROVED MEMBERSHIP INTERFACE

BACKGROUND

Domain Name System (DNS) is a hierarchical distributed naming system that provides a translation service to translate domain names to their corresponding numerical Internet Protocol (IP) addresses. For domains names and their corresponding IP addresses, benign and malicious domains names and their corresponding IP addresses are typically identified by comparing an accessed domain name or IP address, respectively, to approved and disapproved domain name or IP address lists.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
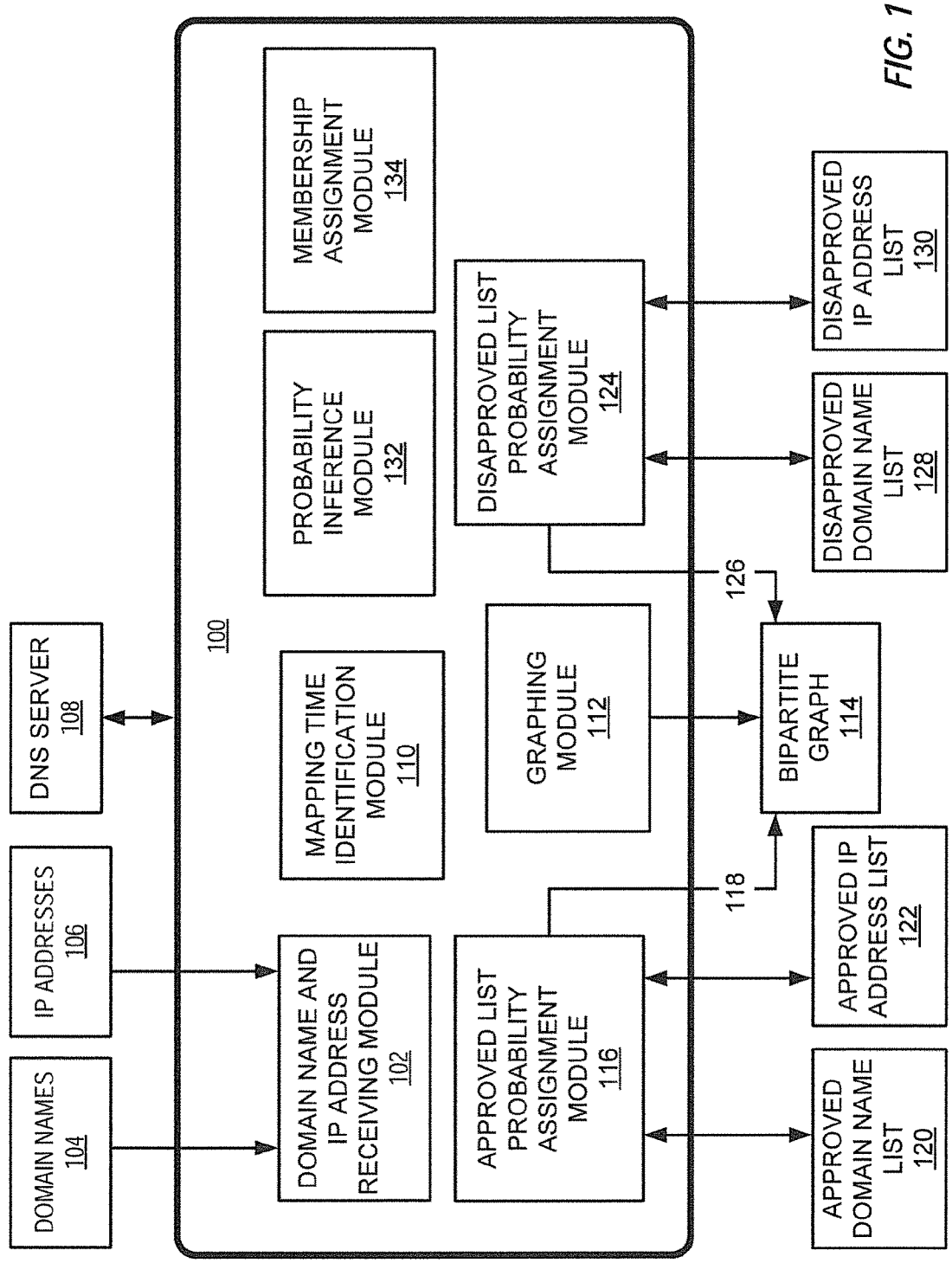
FIG. 1 illustrates an architecture of a domain name and IP address approved and disapproved membership inference apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Typically, infections within an enterprise network can be spawned and spread through domains accessed by the enterprise network's hosts or users. Therefore, identification of benign versus malicious domains accessed by the enterprise network's hosts or users can improve security of such an enterprise network. If a domain name is not present in any of the approved or disapproved domain name lists, then the IP address corresponding to the domain name may be compared to the approved and disapproved IP address lists. Based on a determination of whether the domain name or corresponding IP address is on the approved or disapproved domain name or IP address lists, access to the domain may be allowed or prevented.

The approach of approved and disapproved domain name and IP address lists may be used to evaluate domains names and corresponding IP addresses that include a one-to-one mapping, and are therefore identifiable by a static mapping. Domain names and their corresponding IP addresses can however include a many-to-many mapping. For example, a single IP address may map to a set of domain names, and vice-versa. The many-to-many mappings between domain names and IP addresses may also change over time, for example, due to Dynamic Host Configuration Protocol (DHCP), load balancing, cloud hosting, and Content Delivery Networks (CDNs). For many-to-many mappings between domain names and IP addresses, a static mapping may result in an inaccurate identification of benign versus malicious domains names and their corresponding IP addresses.

Many-to-many mappings may be encountered in several scenarios in enterprise environments. For example, the domain name "lookoutsoft.com" may map to three IP addresses, one being 64.4.6.100. A reverse lookup on the IP address 64.4.6.100 may return, for example, over four-hundred domain names. For a reverse DNS query for the IP address 64.4.6.100, if this IP address is not on approved or disapproved IP address lists, a further analysis of the over four-hundred domain names corresponding to this IP address may result in some domain names that are on an approved domain name list, and other domain names that are not. Therefore, such an analysis may be inconclusive as to whether the IP address 64.4.6.100 is benign or malicious.

According to another example, many benign and malicious domain names may point to a single IP address, such as, 212.154.192.92. However, assuming a reverse DNS query of the IP address 212.154.192.92 results in a redirect domain name, such an analysis may be inconclusive as to whether the IP address or the associated domain names are benign or malicious.

According to examples, a domain name and IP address approved and disapproved membership inference apparatus, and a method for domain name and IP address approved and disapproved membership inference, are disclosed herein. The apparatus and method disclosed herein may generally apply a probability based analysis to infer memberships in approved and disapproved domain name and IP address lists in the presence of many-to-many mappings and incomplete information related to the benign or malicious status of a domain name or an IP address. The incomplete information may represent, for example, the benign or malicious status of a subset of domain names out of the total number of domain names corresponding to an IP address. Therefore, the apparatus and method disclosed herein may predict the membership in the approved and disapproved domain name and IP address lists using a finite a priori knowledge and the many-to-many domain name-to-IP-address mappings.

The apparatus and method disclosed herein may be used, for example, with security systems that use domain name and/or IP address approved and disapproved lists. The security systems may include, for example, intrusion detection systems (IDS), intrusion prevention systems (IPS), spam filters, firewalls, Hypertext Transfer Protocol (HTTP) proxies, and Security Information and Event Management (SIEM) systems. The probability based analysis disclosed herein may be readily scaled to relatively large enterprise environments. The apparatus and method disclosed herein may also utilize a relatively small amount of data. For example, the apparatus and method disclosed herein may rely on <a name="_GoBack"></a> domain name to IP address mappings that are typically collected by enterprises, for example, in the form of DNS requests and responses, and approved and disapproved domain name and IP address lists that are typically used by enterprises. The apparatus and method disclosed herein may also be used to extend existing approved and disapproved domain name and IP address lists. As disclosed herein, domains names and IP addresses that have a high confidence of being benign or malicious may be identified accordingly in existing approved and disapproved domain name and IP address lists. Further, as disclosed herein, any domain names and IP addresses that are not previously identified as being benign or malicious, may also be identified as being benign or malicious.

An example of an application of the apparatus and method disclosed herein may include implementation of a scalable DNS log collection system. For example, the DNS log collection system may use an approved-listing approach to ignore DNS requests for benign domains, and log the remaining DNS requests which are potentially risky. The apparatus and method disclosed herein may be used to augment the approved and disapproved domain name and IP address lists used in the DNS log collection system, and may further provide for the inference of the nature of domain names and IP addresses that are not on the approved and disapproved domain name and IP address lists.

FIG. 1 illustrates an architecture of a domain name and IP address approved and disapproved membership inference apparatus 100 (hereinafter "apparatus 100"), according to an example of the present disclosure. Referring to FIG. 1, the apparatus 100 is depicted as including a domain name and IP address receiving module 102 to receive a set of domain names 104 and/or IP addresses 106. Certain domain names of the domain names 104 may map to certain IP addresses of the IP addresses 106, and vice-versa, per DNS mappings obtained from a DNS server 108. Since the domain name to IP address mappings may change over time, a mapping time identification module 110 may identify a time associated with the mapping and/or receiving of the domain names 104 and the IP addresses 106. A graphing module 112 may represent each of the domain names 104 and the IP addresses 106 as a node in a bipartite graph 114 (e.g., see example of FIG. 2). If a domain name of the domain names 104 maps to an IP address of the IP addresses 106, the graphing module 112 may assign an edge between the particular domain name that is mapped to the IP address.

An approved list probability assignment module 116 may assign a probability 118 to domain names of the domain names 104 and to IP addresses of the IP addresses 106 that have been previously determined to belong to an approved domain name list 120 or to an approved IP address list 122. Further, a disapproved list probability assignment module 124 may assign a probability 126 to domain names of the domain names 104 and to IP addresses of the IP address 106 that have been previously determined to belong to a disapproved domain name list 128 or to a disapproved IP address list 130.

A probability inference module 132 may use a thresholding process as disclosed herein to infer probabilities of the remaining unknown domain names and IP addresses (i.e., unknown domain names and IP addresses that do not appear in the approved domain name list 120, the approved IP address list 122, the disapproved domain name list 128, or the disapproved IP address list 130). Alternatively or additionally, the probability inference module 132 may use a graph inference process as disclosed herein by using the probabilities assigned by the approved list probability assignment module 116 and the disapproved list probability assignment module 124, to infer probabilities of the remaining unknown nodes (i.e., unknown domain names and IP addresses) in the bipartite graph 114.

A membership assignment module 134 may use the results from the probability inference module 132 to assign memberships of the unknown domain names and IP addresses to the approved domain name list 120, the approved IP address list 122, the disapproved domain name list 128, and the disapproved IP address list 130.

As described herein, the modules and other elements of the apparatus 100 may be machine readable instructions stored on a non-transitory computer readable medium. In addition, or alternatively, the modules and other elements of the apparatus 100 may be hardware or a combination of machine readable instructions and hardware.

Referring to FIG. 1, the graphing module 112, the approved list probability assignment module 116, the disapproved list probability assignment module 124, and the probability inference module 132, according to examples thereof, are described in further detail.

The domain name and IP address receiving module 102 may receive the set of domain names 104 and/or IP addresses 106. According to an example, the probability inference module 132 may use a thresholding process as disclosed herein to infer probabilities of the remaining unknown domain names and IP addresses (i.e., unknown domain names and IP addresses that do not appear in the approved domain name list 120, the approved IP address list 122, the disapproved domain name list 128, or the disapproved IP address list 130). Generally, with respect to the thresholding process, given an unknown IP address and the set of domain names to which the IP address is mapped, if more than a predetermined fraction (i.e., percentage) of the domain names are in the approved domain name list 120, then the IP address may also be considered as benign and assigned to the approved IP address list 122. Similarly, for the given unknown IP address and the set of domain names to which the IP address is mapped, if less than or equal to the predetermined fraction of the domain names are in the approved domain name list 120, then the IP address may be considered as malicious and assigned to the disapproved IP address list 130. A similar analysis may be applied to an unknown domain name and the set of IP addresses to which the domain name is mapped. Therefore, with respect to the thresholding process, the probability inference module 132 may consider a domain name that is not present in an approved domain name list 120 or a disapproved domain name list 128, to thus identify the domain name as benign (i.e., approved) or malicious (i.e., disapproved). Similarly, the probability inference module 132 may consider an IP address that is not present in an approved IP address list 122 or a disapproved IP address list 130, to thus identify the IP address as benign or malicious. Thus, when evaluating an unknown domain name, the probability inference module 132 may consider that unknown domain name D resolves to n IP addresses of which m are in the disapproved IP address list 130 (or the approved IP address list 122 depending on the analysis viewpoint). When evaluating an unknown IP address, the probability inference module 132 may consider that unknown IP address resolves to n domain names of which m are in the disapproved domain name list 128 (or the approved domain name list 120 depending on the analysis viewpoint).

According to an example of an implementation of the thresholding process, m/n may be designated as the fraction of IP addresses that are known to be approved. If m/n is greater than a threshold, t (i.e., a predetermined percentage), then the probability inference module 132 may label the unknown domain name corresponding to the IP addresses as benign. Otherwise (i.e., m/n is less than or equal to the threshold t) the probability inference module 132 may label domain name D as malicious. For example, t may be 0.8 or a higher value. The same thresholding process may be applied to unknown IP addresses. Further, the probability inference module 132 may learn the value of t from a training dataset such that the number of errors is minimized.

According to an example of another implementation of the thresholding process, the probability inference module 132 may assign a confidence to labeling of a domain name as benign or malicious (and similarly to IP addresses). For example, with respect to the aforementioned thresholding approach related to determination of the fraction m/n, the probability inference module 132 may assign the same label (e.g., benign or malicious) to two domain names if they have the same fraction with different values of m and n, e.g., 8/10 and 80/100. However, there is greater confidence in the label assigned to 80/100 compared to 8/10. For example, the probability inference module 132 may not know all the IP addresses for a domain name that resolved to 10 IP addresses. In this regard, the probability inference module 132 may use a confidence interval to implement confidence in a label. For example, for the confidence interval, the smaller the confidence interval, the higher the confidence. An example of a confidence interval used by the probability inference module 132 may include an adjusted Wald confidence interval. For example, the 95% adjusted Wald confidence interval for 8/10 is [0.47, 0.95] and for 80/100 is [0.71, 0.87]. Thus, 80/100 is "more likely" to be 0.8 than 8/10, and thus there is more confidence in 80/100. Other examples of confidence intervals used by the probability inference module 132 may include the Wilson interval, or the Clopper-Pearson interval. Thus given a domain name, the probability inference module 132 may compute the fraction and the confidence interval. If the confidence interval is large compared to a confidence interval threshold (e.g., >0.3), then the probability inference module 132 may label the domain name as unknown. However, if the confidence interval is small compared to the confidence interval threshold (e.g., ≤0.3), then the probability inference module 132 may use the fraction and the threshold to label the domain name appropriately (e.g., malicious or benign).

According to an example of another implementation of the thresholding process, the probability inference module 132 may use a bootstrapping process from recommender systems and/or other machine learning systems that rely on a certain amount of data being available for the system to operate properly. The bootstrapping process may be used for the case where the probability inference module 132 may not know all the IP addresses that a domain name resolves to (and vice-versa). With respect to the bootstrapping process, instead of computing the fraction as m/n, the probability inference module 132 may compute an adjusted fraction as follows:

$$(m+C*\text{avg})/(n+N) \qquad \text{Equation (1)}$$

For Equation (1), when evaluating an unknown IP address and the set of domain names to which the IP address is mapped, N may represent the total number of domain names seen thus far, avg may represent the average of the fractions of all N nodes (i.e., nodes in the bipartite graph 114 as disclosed herein), and C may represent a constant. Similarly, when evaluating an unknown domain name and the set of IP addresses to which the domain name is mapped, N may represent the total number of IP addresses seen thus far, avg may represent the average of the fractions of all N nodes, and C may represent a constant. With respect to Equation (1), the confidence in a domain name's fraction may increase if the domain name resolves to C or more IP addresses (and vice-versa for an IP address fraction). Further, if m is less than C, then the adjusted fraction will be close to the average fraction avg. A node's fraction may impact the analysis using Equation (1) if there is sufficient information on the node. Thus, given a domain name, the probability inference module 132 may compute its adjusted fraction (and similarly for a given IP address). The probability inference module 132 may further compare the adjusted fraction with the threshold to label the domain name as benign or malicious.

The membership assignment module 134 may use the thresholding based results from the probability inference module 132 to assign memberships of the unknown domain names and IP addresses to the approved domain name list 120, the approved IP address list 122, the disapproved domain name list 128, and the disapproved IP address list 130.

Figure 2:
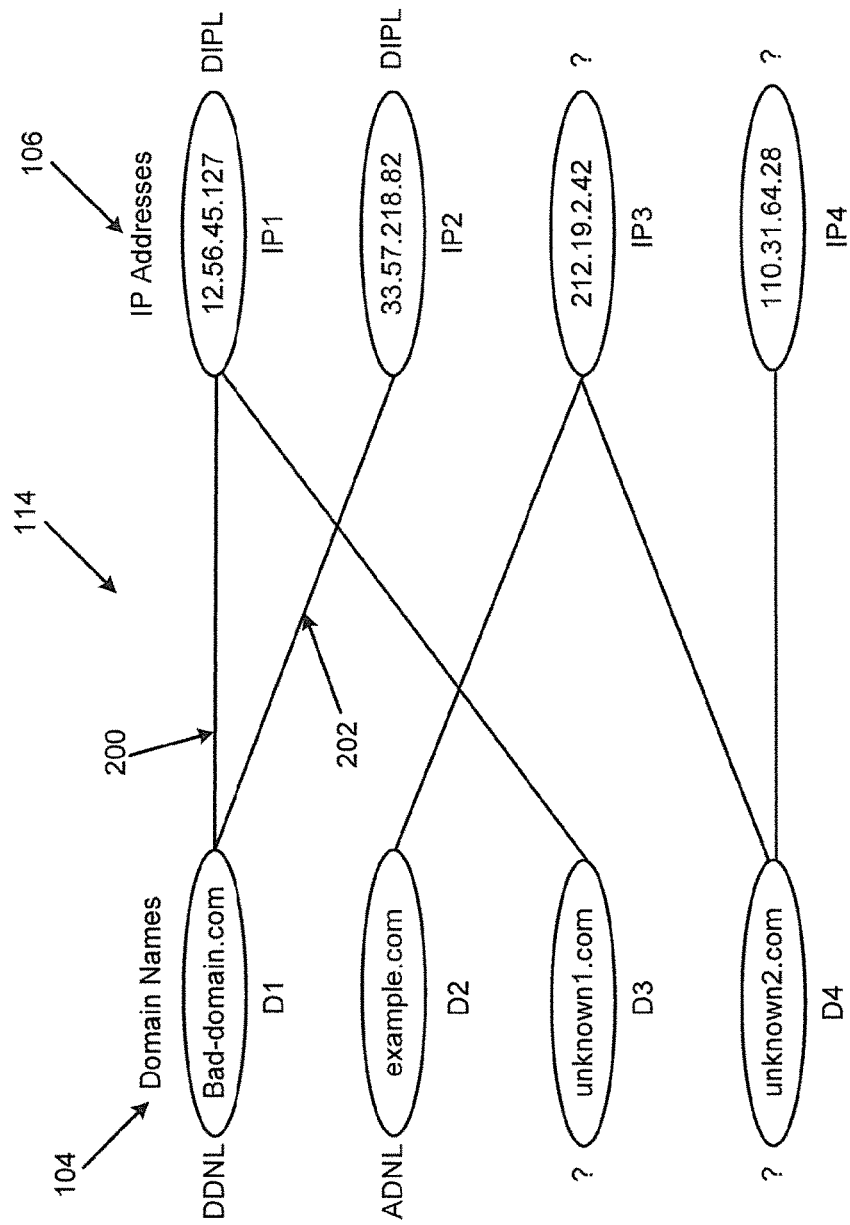
FIG. 2 illustrates a bipartite graph for an application example of the apparatus of FIG. 1, according to an example of the present disclosure.

FIG. 2 illustrates a bipartite graph 114 for an application example of the apparatus 100, according to an example of the present disclosure. As shown in the example of the bipartite graph 114, the domain names 104 and the IP addresses 106 may be represented as nodes in the bipartite graph 114. For the example of FIG. 2, domain name "bad-domain.com", designated as D1, may be previously determined to belong to the disapproved domain name list 128. The domain name "example.com", designated as D2, may be previously determined to belong to the approved domain name list 120. The domain name "unknown1.com", designated as D3, and the domain name "unknown2.com", designated as D4, may be designated as unknown domain names in the bipartite graph 114. The IP address "12.56.45.127", designated as IP1, and the IP address "33.57.218.82", designated as IP2, may be previously determined to belong to the disapproved IP address list 130. The IP address "212.19.2.42", designated as IP3, and the IP address "110.31.64.28", designated as IP4, may be designated as unknown IP addresses in the bipartite graph 114.

The approved list probability assignment module 116 may assign the probability 118, for example, of 0.99, to a domain name 104 and to an IP address 106 that has been previously determined to belong to the approved domain name list 120 or to the approved IP address list 122. Further, the disapproved list probability assignment module 124 may assign the probability 126, for example, of 0.01 (e.g., 1—the probability 118) to a domain name 104 and to an IP address 106 that has been previously determined to belong to the disapproved domain name list 128 or to the disapproved IP address list 130.

In order to infer probabilities of the unknown nodes (e.g., unknown domain names D3 and D4, and IP addresses IP3 and IP4 for the example of FIG. 2) in the bipartite graph 114, the probability inference module 132 may use a graph inference process as disclosed herein by using the probabilities assigned by the approved list probability assignment module 116 and the disapproved list probability assignment module 124, to infer probabilities of the remaining unknown nodes (i.e., unknown domain names D3, and D4, and IP addresses IP3, and IP4) in the bipartite graph 114. With respect to the graph inference process, the graphing module 112 may generate the bipartite graph 114 by adding an edge between a domain name and an IP address the domain name resolves to. For the example of FIG. 2, the graphing module 112 may generate the bipartite graph 114 by adding edges 200, 202, respectively between D1 and IP1, and D1 and IP2. Other edges may be similarly generated for the bipartite graph 114. As shown in FIG. 2, some of the domain names (and IP addresses) may be benign (e.g., D2) because they are in the approved domain name list 120, and some of the domain names (and IP addresses) may be malicious (e.g., D1, IP1, and IP2) because they are in the disapproved domain name list 128, and the disapproved IP address list 130. The probability inference module 132 may use, for example, Bayesian inference, belief propagation, or a Dempster-Shafer process to infer probabilities of the unknown nodes (e.g., D3, D4, IP3, and IP4 in the example of FIG. 2).

With respect to the Bayesian inference process, the probability inference module 132 may infer the marginal probability (i.e., the likelihood of being malicious (or benign) given the domain names and IP addresses in the approved domain name list 120, the approved IP address list 122, the disapproved domain name list 128, and the disapproved IP address list 130), of the rest of the unknown domain names and IP addresses (e.g., D3, D4, IP3, and IP4 in the example of FIG. 2). The Bayesian inference process may be used to determine exact probabilities for unknown nodes if the bipartite graph 114 includes no loops. Generally, the marginal probability of a random variable X, given a set of variables, may be represented as the summation of the joint probability distribution of all the variables over all possible values of all variables in the set except X. For example, referring to FIG. 2, in order to determine the marginal probability of D3 to be in the approved domain name list 120, the probability of a domain name or IP address belonging to the approved domain name list 120 or the approved IP address list 122 may be represented as the probability of the corresponding node. Thus, in order to determine the marginal probability of D3 to be in the approved domain name list 120, the probability inference module 132 may determine the probability of D3 being equal to 1 as follows:

$$Pr(D3=1)=\Sigma_{D1,D2,D4,IP1,IP2,IP3,IP4}Pr(D3=1,D1,D2,D4,IP1,IP2,IP3,IP4) \quad \text{Equation (2)}$$

Referring to FIG. 2, it can be seen that certain probabilities (e.g., D1, D2, IP1, and IP2) are known a-priori. For example, it can be seen that the domain name "bad-domain.com" represented by D1 belongs to the disapproved domain name list 128. Therefore the probability of D1 being 0 is 1, and the probability that D1 has any value other than 0 is 0. In the example of FIG. 2, although the probabilities are indicated as being 1 and 0, in order to account for miscalculations related to the a priori status of the domain names and IP addresses, the probability inference module 132 may instead use probability values, for example, of 0.99 and 0.01. Therefore, for the example of FIG. 2, for probabilities indicated as being 1 and 0, the probabilities for D1, D2, IP1, and IP2 may be indicated as follows: Pr(D1=0)=1; Pr(D2=1)=1; Pr(IP1=0)=1; and Pr(IP2=0)=1.

The probability inference module 132 may substitute the known probability values in Equation (2) as follows:

$$Pr(D3=1)=\Sigma_{D4,IP3,IP4}Pr(D3=1,D1=0,D2=1,D4,IP1=0,IP2=0,IP3,IP4) \quad \text{Equation (3)}$$

$$Pr(D3=1)=\Sigma_{D4,IP3,IP4}Pr(D3=1,D4,IP3,IP4) \quad \text{Equation (4)}$$

In this manner, the probability inference module 132 may substitute known values of probabilities of other variables to determine the marginal probability of a given variable.

With respect to belief propagation, the probability inference module 132 may determine approximate probabilities for unknown nodes if the bipartite graph 114 includes loops. Generally, the probability inference module 132 may assign, for example, a prior probability of 0.5 to unknown nodes (e.g., D3, D4, IP3, and IP4 in the example of FIG. 2), and then update the probabilities or beliefs by passing messages between neighboring nodes. Thus, the probability inference module 132 may determine approximate probabilities by determining the marginal distribution for each unknown node (e.g., D3, D4, IP3, or IP4 in the example of FIG. 2), conditional on any known nodes (e.g., D1, D2, IP1, and IP2, in the example of FIG. 2).

With respect to belief propagation, given an undirected graph (i.e., the bipartite graph 114), G=(V, E), where V is a set of n nodes and E is a set of edges, the probability inference module 132 may model every node i∈V as a random variable, $x_i$, that can be in a finite set, S, of states. A graphical model may be used to define a joint probability distribution, $P(x_1, x_2, \ldots, X_n)$ over G's nodes. The inference process used by the probability inference module 132 may compute the marginal probability distribution, $P(x_i)$, for each random variable, $x_i$. A node's marginal probability may be defined in terms of sums of the joint probability distribution over all possible states of all other nodes in the bipartite graph 114 as follows:

$$P(x_i)=\Sigma_{x_1}"\Sigma_{x_{i-1}}\Sigma_{x_{i+1}}"\Sigma_{x_n}P(x_1,x_2,\ldots,x_n) \quad \text{Equation (5)}$$

The number of terms in the sum may be exponential in the number of nodes, n. The probability inference module 132 may use belief propagation to approximate the marginal probability distributions of all nodes in time linear in the number of edges, which is at most $O(n^2)$.

The probability inference module 132 may use belief propagation to estimate a node's marginal probability from prior knowledge about the nodes of the bipartite graph 114 and their statistical dependencies. A node, is, belief, $b_i(x_i)$, is i's marginal probability of being in the state $x_i$. For a node i, $b_i(x_i)$'s computation may depend on priors of the nodes of the bipartite graph 114. A node i's, prior, $\phi_i(x_i)$, is i's initial (or prior) probability of being in the state x. A node's priors may indicate the node's initial likelihood of being in malicious and benign states. The probability inference module 132 may estimate a node's priors using ground truth information. For a node i, $b_i(x_i)$'s computation may also depend on edge potential functions that model the statistical dependencies among neighboring nodes. The edge potential, $\psi_{ij}(x_i, x_j)$, between two neighboring nodes, i and j, may represent the probability of the node i being in the state $x_i$, and the node j being in the state $x_j$.

For example, given a domain name (e.g., i), if the domain name is assumed to be benign, then the IP addresses (e.g., j) the domain name resolves to (represented as a graph edge) may be considered to be benign with a probability of A (e.g., 0.51). If the domain name is assumed to be benign, then the IP address the domain name resolves to may be considered to be malicious with a probability of A', where A' is less than A (e.g., in some instances, 1-A, where A>0.5). If the domain name is assumed to be malicious, then the IP address the domain name resolves to may be considered to be malicious with a probability of B (e.g., 0.51). If the domain name is assumed to be malicious, then the IP address the domain name resolves to may be considered to be benign with a probability of B', where B' is less than B (e.g., in some instances, 1-B, where B>0.5). In some examples, A and B may be equal to 0.51, and A' and B' may be equal to 0.49. Analogous inferences may be made for the state of behavior of an IP address based on the state of behavior of a domain name.

The probability inference module 132 may use belief propagation to achieve computational efficiency by organizing global marginal probability computation in terms of smaller local computations at each node. This may be performed by iterative message passing among neighboring nodes. For example, for a node, i, and its neighbors, N(i), in each iteration of belief propagation, node i passes a message vector, $m_{ij}$, to each of its neighbors, $j \in N$. Each component, $m_{ij}(x_j)$, of the message vector may be proportional to node is perception of node j's likelihood of being in the state $x_j$. The outgoing message vector for node i to its neighbor node j may depend on node i's incoming message vectors from its other neighbors and may be determined as follows:

$$m_{ij}(x_j)=\Sigma_{x_i \in S}\phi_i(x_i)\psi_{ij}(x_i,x_j)\Pi_{k \in N(i) \setminus j}m_{ki}(x_i) \quad \text{Equation (6)}$$

For Equation (6), k may represent all neighbors of i other than j.

Messages for belief propagation may be passed in any order. In a synchronous update order, node i's outgoing messages in iteration t may be computed from node i's incoming messages in iteration t−1. In a synchronous update order, incoming messages may be used as soon as they are available. The iterations for belief propagation may stop when the messages converge within a predetermined threshold. The probability inference module 132 may then compute a node, i's, belief values from node Is incoming messages in the converged iteration as follows:

$$b_i(x_i)=C\phi(x_i)\Pi_{k \in N(i)}m_{ki}(x_i) \quad \text{Equation (7)}$$

For Equation (7), C may represent a normalization constant to ensure that node Is beliefs add up to 1 as follows:

$$\Sigma_{x_i \in S}b_i(x_i)=1 \quad \text{Equation (8)}$$

With respect to the Dempster-Shafer process, the probability inference module 132 may use this process to compute a degree of belief by combining evidence from multiple sources. Referring to the bipartite graph 114 in the example of FIG. 2, the probability inference module 132 may compute the belief that whether a node (i.e., an IP address or a domain name) is benign, malicious, or unknown. The evidence used may be determined from the nodes that are in the approved domain name list 120, the approved IP address list 122, the disapproved domain name list 128, and the disapproved IP address list 130 (e.g., the nodes D1, D2, IP1, and IP2, in the example of FIG. 2). For example, if a domain name is in the approved domain name list 120, then the following initial beliefs may be assigned to the domain name: {benign=0.99, malicious=0.00, unknown=0.01}. If a domain name is in the disapproved domain name list 128, then the following initial beliefs may be assigned to the domain name: {benign=0.00, malicious=0.99, unknown=0.01}. If a domain is not in the approved domain name list 120 or the disapproved domain name list 128, then the following initial beliefs may be assigned to the domain name: {benign=0.00, malicious=0.00, unknown=1.00}. Initial beliefs for IP addresses may be assigned similarly from the approved IP address list 122, and the disapproved IP address list 130. The probability inference module 132 may compute a belief for a domain name (or an IP address) by combining the evidence from the IP addresses the domain name resolves to, with the combination being performed by following Dempster's rule of combination. Thus, the probability inference module 132 may assign a belief mass to states using initial information from the approved domain name list 120, the approved IP address list 122, the disapproved domain name list 128, and the disapproved IP address list 130 (e.g., for nodes D1, D2, IP1, and IP2, for the example of FIG. 2), and then use rules of combination to compute the probabilities for unknown nodes (e.g., D3, D4, IP3, and IP4, for the example of FIG. 2).

The membership assignment module 134 may use the graph inference based results from the probability inference module 132 to assign memberships of the unknown domain names and IP addresses to the approved domain name list 120, the approved IP address list 122, the disapproved domain name list 128, and the disapproved IP address list 130.

Since the bipartite graph 114 is dynamic in nature (i.e., time dependent), the graphing module 112 may update the bipartite graph 114, and the aforementioned calculations related to thresholding and graph inference may be re-computed. According to an example, if the apparatus 100 includes access to DNS requests and responses from the DNS server 108 in a network, the graphing module 112 may update the bipartite graph 114 in real time. Moreover, for the bipartite graph 114, the probabilities of the nodes may be updated independently in parallel and as needed. For example, the probability inference module 132 may re-compute the probabilities in those nodes where a new edge has been added and/or an edge has been deleted.

Figure 3:
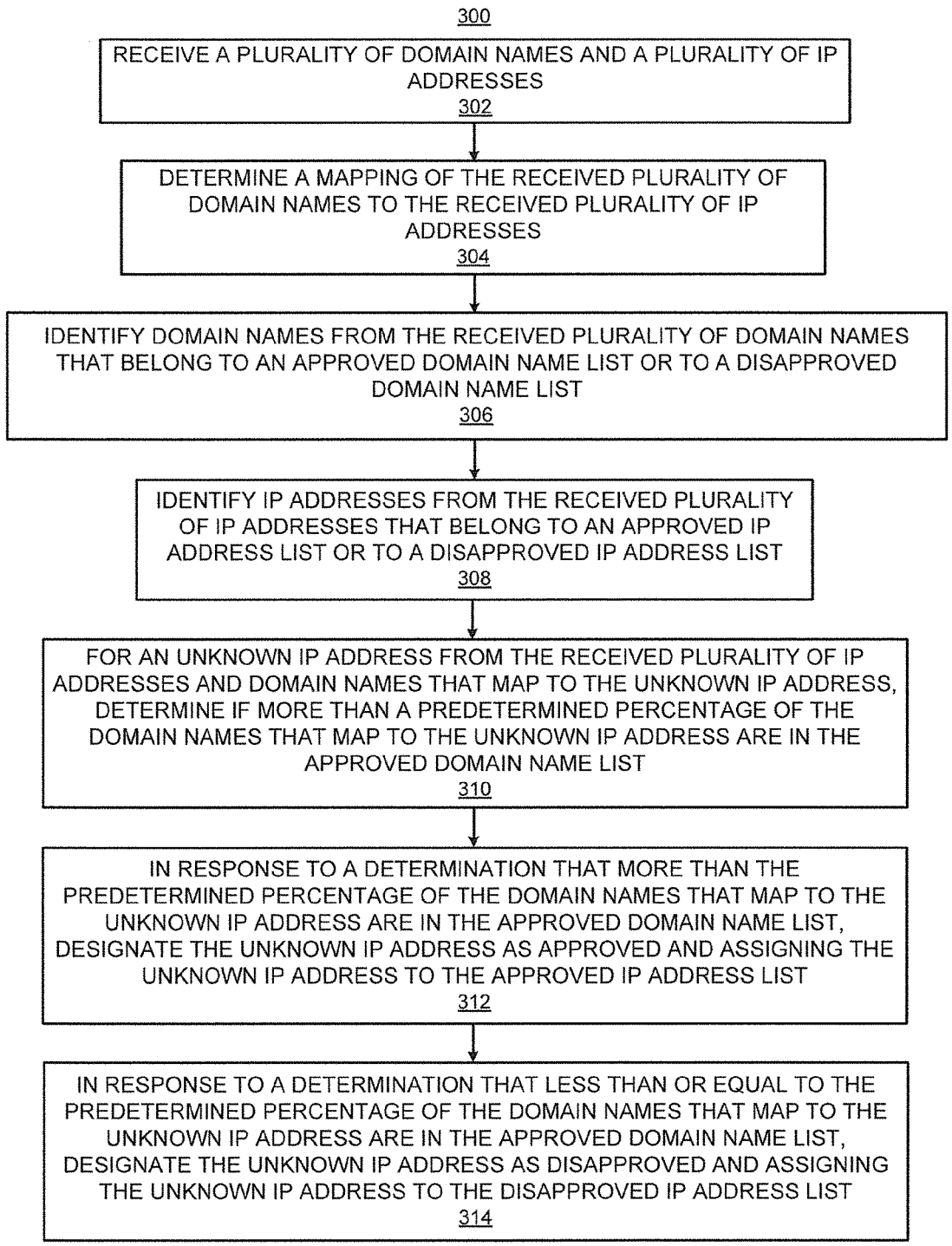
FIG. 3 illustrates a method for domain name and IP address approved and disapproved membership inference, according to an example of the present disclosure.
Figure 4:
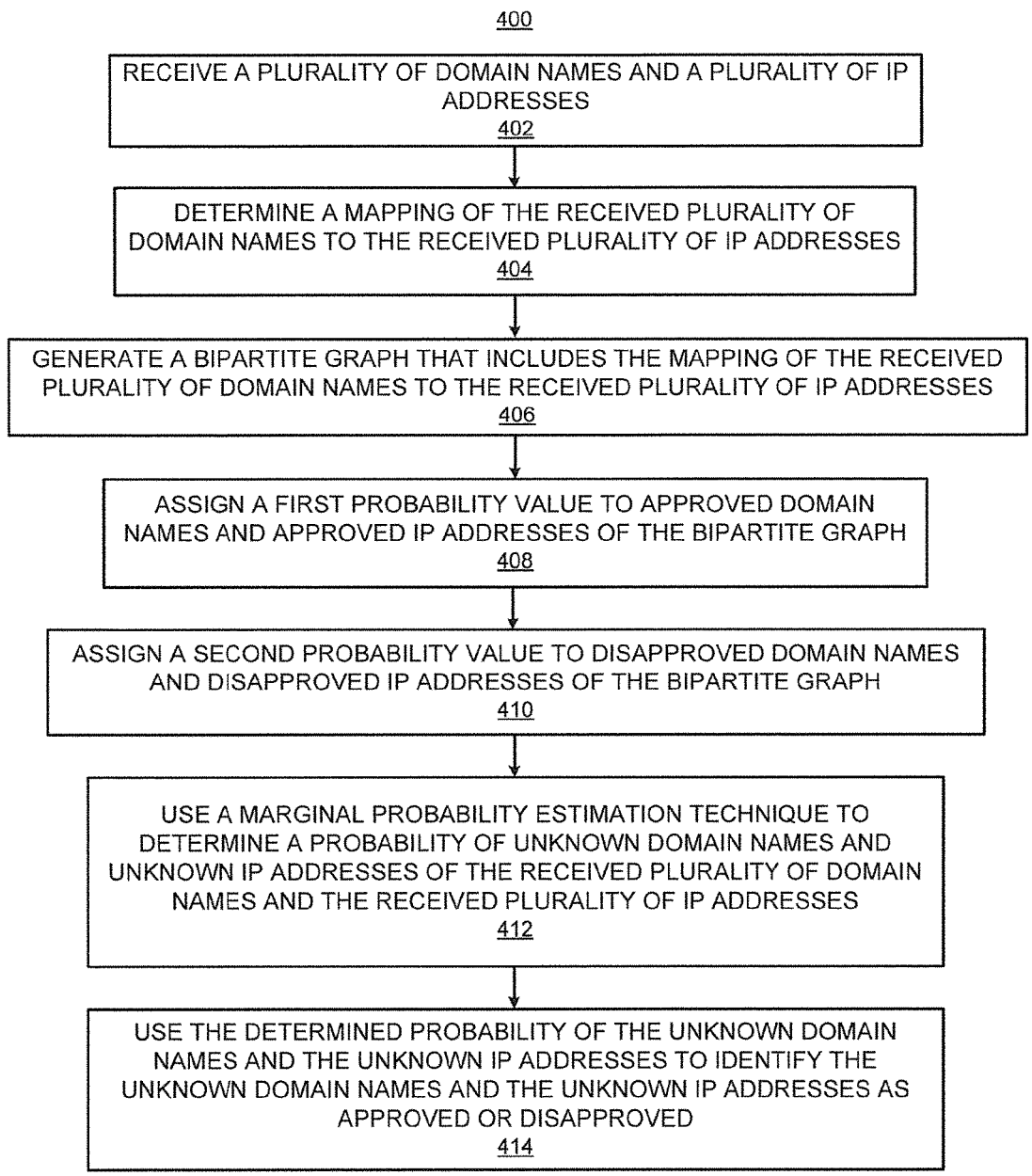
FIG. 4 illustrates further details of the method for domain name and IP address approved and disapproved membership inference, according to an example of the present disclosure.

FIGS. 3 and 4 respectively illustrate flowcharts of methods 300 and 400 for domain name and IP address approved and disapproved membership inference, corresponding to the example of the domain name and IP address approved and disapproved membership inference apparatus 100 whose construction is described in detail above. The methods 300 and 400 may be implemented on the domain name and IP address approved and disapproved membership inference apparatus 100 with reference to FIGS. 1 and 2 by way of example and not limitation. The methods 300 and 400 may be practiced in other apparatus.

Referring to FIG. 3, for the method 300, at block 302, the method may include receiving a plurality of domain names 104 and a plurality of IP addresses 106.

At block 304, the method may include determining a mapping of the received plurality of domain names 104 to the received plurality of IP addresses 106. For example, certain domain names of the domain names 104 may map to certain IP addresses of the IP addresses 106, and vice-versa, per DNS mappings obtained from the DNS server 108.

At block 306, the method may include identifying domain names from the received plurality of domain names 104 that belong to an approved domain name list 120 or to a disapproved domain name list 128.

At block 308, the method may include identifying IP addresses from the received plurality of IP addresses that belong to an approved IP address list 122 or to a disapproved IP address list 130.

At block 310, for an unknown IP address from the received plurality of IP addresses 106 and domain names that map to the unknown IP address, the method may include determining if more than a predetermined percentage of the domain names that map to the unknown IP address are in the approved domain name list 120, for example, by using the thresholding process with the probability inference module 132. Determining if more than a predetermined percentage of the domain names that map to the unknown IP address are in the approved domain name list 120 may further include computing an adjusted fraction (e.g., Equation (1)) related to the domain names that map to the unknown IP address by accounting for a total number of the received plurality of domain names 104, and accounting for an average of all fractions of nodes of a bipartite graph 114 used to represent the mapping of the received plurality of domain names 104 to the received plurality of IP addresses 106, and comparing the computed adjusted fraction to a threshold to determine whether the unknown IP address is designated as approved or as disapproved.

At block 312, in response to a determination that more than the predetermined percentage of the domain names that map to the unknown IP address are in the approved domain name list 120, the method may include designating the unknown IP address as approved and assigning the unknown IP address to the approved IP address list 122.

At block 314, in response to a determination that less than or equal to the predetermined percentage of the domain names that map to the unknown IP address are in the approved domain name list 120, the method may include designating the unknown IP address as disapproved and assigning the unknown IP address to the disapproved IP address list 130.

According to an example, for an unknown domain name from the received plurality of domain names 104 and IP addresses that map to the unknown domain name, the method 300 may include determining if more than a predetermined percentage of the IP addresses that map to the unknown domain name are in the approved IP address list 122. In response to a determination that more than the predetermined percentage of the IP addresses that map to the unknown domain name are in the approved IP address list 122, the method 300 may include designating the unknown domain name as approved and assigning the unknown domain name to the approved domain name list 120. In response to a determination that less than or equal to the predetermined percentage of the IP addresses that map to the unknown domain name are in the approved IP address list 122, the method 300 may include designating the unknown domain name as disapproved and assigning the unknown domain name to the disapproved domain name list 128. Determining if more than a predetermined percentage of the IP addresses that map to the unknown domain name are in the approved IP address list 122 may further include computing an adjusted fraction (e.g., Equation (1)) related to the IP addresses that map to the unknown domain name by accounting for a total number of the received plurality of IP addresses 106, and accounting for an average of all fractions of nodes of a bipartite graph 114 used to represent the mapping of the received plurality of domain names 104 to the received plurality of IP addresses 106, and comparing the computed adjusted fraction to a threshold to determine whether the unknown domain name is designated as approved or as disapproved.

According to an example, the method 300 may include assigning a confidence interval to the designation of the unknown IP address as approved or disapproved, and determining if the confidence interval is greater than a predetermined confidence interval threshold. In response to a determination that the confidence interval is greater than the predetermined confidence interval threshold, the method 300 may include designating the unknown IP address as unknown. In response to a determination that the confidence interval is less than or equal to the predetermined confidence interval threshold, the method 300 may include designating the unknown IP address as approved or disapproved based on the determination that more than, or less than or equal to, the predetermined percentage of the domain names that map to the unknown IP address are in the approved domain name list 120.

According to an example, the method 300 may include assigning a confidence interval to the designation of the unknown domain name as approved or disapproved, and determining if the confidence interval is greater than a predetermined confidence interval threshold. In response to a determination that the confidence interval is greater than the predetermined confidence interval threshold, the method 300 may include designating the unknown domain name as unknown. In response to a determination that the confidence interval is less than or equal to the predetermined confidence interval threshold, the method 300 may include designating the unknown domain name as approved or disapproved based on the determination that more than, or less than or equal to, the predetermined percentage of the IP addresses that map to the unknown domain name are in the approved IP address list 122.

According to an example, the method 300 may include marking a time, for example, by using the mapping time identification module 110, associated with the receiving of the plurality of domain names 104 and the receiving of the plurality of IP addresses 106, and determining if the time associated with the receiving of the plurality of domain names 104 and the receiving of the plurality of IP addresses 106 exceeds a predetermined time interval based on a current time. In response to a determination that the time associated with the receiving of the plurality of domain names 104 and the receiving of the plurality of IP addresses 106 exceeds the predetermined time interval based on the current time, the method 300 may include updating the mapping of the received plurality of domain names 104 to the received plurality of IP addresses 106. In response to a determination that the time associated with the receiving of the plurality of domain names 104 and the receiving of the plurality of IP addresses 106 is less than or equal to the predetermined time interval based on the current time, the method 300 may include waiting for the time associated with the receiving of the plurality of domain names 104 and the receiving of the plurality of IP addresses 106 to exceed the predetermined time interval before updating the mapping of the received plurality of domain names 104 to the received plurality of IP addresses 106.

Referring to FIG. 4, for the method 400, at block 402, the method may include receiving a plurality of domain names 104 and a plurality of IP addresses 106.

At block 404, the method may include determining a mapping of the received plurality of domain names 104 to the received plurality of IP addresses 106.

At block 406, the method may include generating a bipartite graph 114 that includes the mapping of the received plurality of domain names 104 to the received plurality of IP addresses 106.

At block 408, the method may include assigning a first probability value to approved domain names and approved IP addresses of the bipartite graph 114. The first probability value may be less than 1.0 to account for miscalculations related to the approved status of the approved domain names and approved IP addresses.

At block 410, the method may include assigning a second probability value to disapproved domain names and disapproved IP addresses of the bipartite graph 114. The second probability value may be 1.0 minus the first probability value.

At block 412, the method may include using a marginal probability estimation technique to determine a probability of unknown domain names and unknown IP addresses of the received plurality of domain names 104 and the received plurality of IP addresses 106. Using a marginal probability estimation technique to determine a probability of unknown domain names and unknown IP addresses of the received plurality of domain names 104 and the received plurality of IP addresses 106 may further include, in response to a determination that the bipartite graph does not include loops, using the first and second probability values to determine a marginal probability of unknown domain names and unknown IP addresses of the received plurality of domain names 104 and the received plurality of IP addresses 106 by summing over the first and second probability values.

At block 414, the method may include using the determined probability of the unknown domain names and the unknown IP addresses to identify the unknown domain names and the unknown IP addresses as approved or disapproved.

According to an example, the method 400 may include using belief propagation to determine the probability of the unknown domain names and the unknown IP addresses of the received plurality of domain names 104 and the received plurality of IP addresses 106.

According to an example, the method 400 may include using a Dempster-Shafer process to determine the probability of the unknown domain names and the unknown IP addresses of the received plurality of domain names 104 and the received plurality of IP addresses 106.

According to an example, the method 400 may include marking a time (e.g., by using mapping time identification module 110) associated with the receiving of the plurality of domain names 104 and the receiving of the plurality of IP addresses 106, and determining if the time associated with the receiving of the plurality of domain names 104 and the receiving of the plurality of IP addresses 106 exceeds a predetermined time interval based on a current time. In response to a determination that the time associated with the receiving of the plurality of domain names 104 and the receiving of the plurality of IP addresses 106 exceeds the predetermined time interval based on the current time, the method 400 may include updating the bipartite graph 114 to update the mapping of the received plurality of domain names 104 to the received plurality of IP addresses 106. In response to a determination that the time associated with the receiving of the plurality of domain names 104 and the receiving of the plurality of IP addresses 106 is less than or equal to the predetermined time interval based on the current time, the method 400 may include waiting for the time associated with the receiving of the plurality of domain names 104 and the receiving of the plurality of IP addresses 106 to exceed the predetermined time interval before updating the bipartite graph 114 to update the mapping of the received plurality of domain names 104 to the received plurality of IP addresses 106.

According to an example, a method for domain name and IP address approved and disapproved membership inference may include receiving a plurality of domain names 104 and a plurality of IP addresses 106. The method may further include determining a mapping (e.g., by using the DNS server 108) of the received plurality of domain names 104 to the received plurality of IP addresses 104, and generating a bipartite graph 114 that includes the mapping of the received plurality of domain names 104 to the received plurality of IP addresses 106. The method may further include assigning a first probability value (e.g., by using the approved list probability assignment module 116) to approved domain names and approved IP addresses of the bipartite graph 114, and assigning a second probability value (e.g., by using the disapproved list probability assignment module 124) to disapproved domain names and disapproved IP addresses of the bipartite graph 114. A marginal probability estimation technique may be used to determine a probability of unknown domain names and unknown IP addresses of the received plurality of domain names 104 and the received plurality of IP addresses 106. The determined probability of the unknown domain names and the unknown IP addresses may be used to identify the unknown domain names and the unknown IP addresses as approved or disapproved. The method may further include marking a time (e.g., by using the mapping time identification module 110) associated with the receiving of the plurality of domain names 104 and the receiving of the plurality of IP addresses 106, and determining if the time associated with the receiving of the plurality of domain names 104 and the receiving of the plurality of IP addresses 106 exceeds a predetermined time interval based on a current time. In response to a determination that the time associated with the receiving of the plurality of domain names 104 and the receiving of the plurality of IP addresses 106 exceeds the predetermined time interval based on the current time, the determination of the mapping of the received plurality of domain names 104 to the received plurality of IP addresses 106 may be updated. Further, the determination of the probability of the unknown domain names and the unknown IP addresses for nodes in the bipartite graph 114 for which the mapping has changed may be updated without updating the determination of the probability of the unknown domain names and the unknown IP addresses for nodes in the bipartite graph 114 for which the mapping has not changed.

Figure 5:
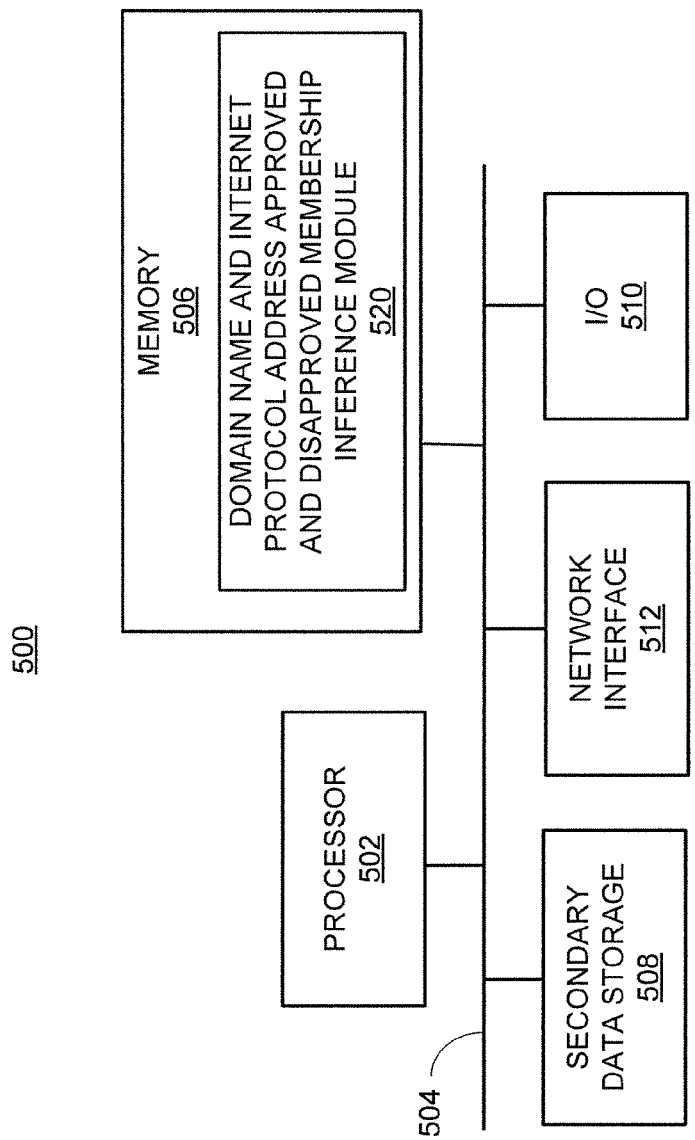
FIG. 5 illustrates a computer system, according to an example of the present disclosure.

FIG. 5 shows a computer system 500 that may be used with the examples described herein. The computer system may represent a generic platform that includes components that may be in a server or another computer system. The computer system 500 may be used as a platform for the apparatus 100. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include a domain name and IP address approved and disapproved membership inference module 520 including machine readable instructions residing in the memory 506 during runtime and executed by the processor 502. The domain name and IP address approved and disapproved membership inference module 520 may include the modules of the apparatus 100 shown in FIG. 1.

The computer system 500 may include an I/O device 510, such as a keyboard, a mouse, a display, etc. The computer system may include a network interface 512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for domain name and Internet Protocol (IP) address approved and disapproved membership inference, the method comprising:
  receiving a plurality of domain names and a plurality of IP addresses;
  determining a mapping of the received plurality of domain names to the received plurality of IP addresses;
  identifying domain names from the received plurality of domain names that belong to an approved domain name list or to a disapproved domain name list;
  identifying IP addresses from the received plurality of IP addresses that belong to an approved IP address list or to a disapproved IP address list;
  for an unknown IP address from the received plurality of IP addresses and domain names that map to the unknown IP address, determining, by at least one processor, if more than a predetermined percentage of the domain names that map to the unknown IP address are in the approved domain name list;
  in response to a determination that more than the predetermined percentage of the domain names that map to the unknown IP address are in the approved domain name list, designating the unknown IP address as approved and assigning the unknown IP address to the approved IP address list; and
  in response to a determination that less than or equal to the predetermined percentage of the domain names that map to the unknown IP address are in the approved domain name list, designating the unknown IP address as disapproved and assigning the unknown IP address to the disapproved IP address list.

2. The method of claim 1, further comprising:
  for an unknown domain name from the received plurality of domain names and IP addresses that map to the unknown domain name, determining if more than a predetermined percentage of the IP addresses that map to the unknown domain name are in the approved IP address list;
  in response to a determination that more than the predetermined percentage of the IP addresses that map to the unknown domain name are in the approved IP address list, designating the unknown domain name as approved and assigning the unknown domain name to the approved domain name list; and
  in response to a determination that less than or equal to the predetermined percentage of the IP addresses that map to the unknown domain name are in the approved IP address list, designating the unknown domain name as disapproved and assigning the unknown domain name to the disapproved domain name list.

3. The method of claim 1, further comprising:
  assigning a confidence interval to the designation of the unknown IP address as approved or disapproved;
  determining if the confidence interval is greater than a predetermined confidence interval threshold;
  in response to a determination that the confidence interval is greater than the predetermined confidence interval threshold, designating the unknown IP address as unknown; and
  in response to a determination that the confidence interval is less than or equal to the predetermined confidence interval threshold, designating the unknown IP address as approved or disapproved based on the determination that more than, or less than or equal to, the predetermined percentage of the domain names that map to the unknown IP address are in the approved domain name list.

4. The method of claim 2, further comprising:
  assigning a confidence interval to the designation of the unknown domain name as approved or disapproved;
  determining if the confidence interval is greater than a predetermined confidence interval threshold;
  in response to a determination that the confidence interval is greater than the predetermined confidence interval threshold, designating the unknown domain name as unknown; and
  in response to a determination that the confidence interval is less than or equal to the predetermined confidence interval threshold, designating the unknown domain name as approved or disapproved based on the determination that more than, or less than or equal to, the predetermined percentage of the IP addresses that map to the unknown domain name are in the approved IP address list.

5. The method of claim 1, wherein determining if more than a predetermined percentage of the domain names that map to the unknown IP address are in the approved domain name list further comprises:
  computing an adjusted fraction related to the domain names that map to the unknown IP address by:
    accounting for a total number of the received plurality of domain names, and
    accounting for an average of all fractions of nodes of a bipartite graph used to represent the mapping of the received plurality of domain names to the received plurality of IP addresses; and
  comparing the computed adjusted fraction to a threshold to determine whether the unknown IP address is designated as approved or as disapproved.

6. The method of claim 2, wherein determining if more than a predetermined percentage of the IP addresses that map to the unknown domain name are in the approved IP address list further comprises:
  computing an adjusted fraction related to the IP addresses that map to the unknown domain name by:
    accounting for a total number of the received plurality of IP addresses, and
    accounting for an average of all fractions of nodes of a bipartite graph used to represent the mapping of the received plurality of domain names to the received plurality of IP addresses; and
  comparing the computed adjusted fraction to a threshold to determine whether the unknown domain name is designated as approved or as disapproved.

7. The method of claim 1, further comprising:
  marking a time associated with the receiving of the plurality of domain names and the receiving of the plurality of IP addresses;
  determining if the time associated with the receiving of the plurality of domain names and the receiving of the plurality of IP addresses exceeds a predetermined time interval based on a current time;
  in response to a determination that the time associated with the receiving of the plurality of domain names and the receiving of the plurality of IP addresses exceeds the predetermined time interval based on the current time, updating the mapping of the received plurality of domain names to the received plurality of IP addresses; and in response to a determination that the time associated with the receiving of the plurality of domain names and the receiving of the plurality of IP addresses is less than or equal to the predetermined time interval based on the current time, waiting for the time associated with the receiving of the plurality of domain names and the receiving of the plurality of IP addresses to exceed the predetermined time interval before updating the mapping of the received plurality of domain names to the received plurality of IP addresses.

8. A non-transitory machine-readable storage medium comprising instructions that when executed by a processing resource cause a computing device to:

receive a plurality of domain names and a plurality of IP addresses;

determine a mapping of the received plurality of domain names to the received plurality of IP addresses;

identify domain names from the received plurality of domain names that belong to an approved domain name list or to a disapproved domain name list;

identify IP addresses from the received plurality of IP addresses that belong to an approved IP address list or to a disapproved IP address list;

for an unknown IP address from the received plurality of IP addresses and domain names that map to the unknown IP address, determine, by at least one processor, if more than a predetermined percentage of the domain names that map to the unknown IP address are in the approved domain name list;

in response to a determination that more than the predetermined percentage of the domain names that map to the unknown IP address are in the approved domain name list, designate the unknown IP address as approved and assigning the unknown IP address to the approved IP address list; and in response to a determination that less than or equal to the predetermined percentage of the domain names that map to the unknown IP address are in the approved domain name list, designate the unknown IP address as disapproved and assigning the unknown IP address to the disapproved IP address list.

9. The non-transitory machine-readable storage medium of claim 8, wherein the instructions further cause the computing device to:

for an unknown domain name from the received plurality of domain names and IP addresses that map to the unknown domain name, determine if more than a predetermined percentage of the IP addresses that map to the unknown domain name are in the approved IP address list;

in response to a determination that more than the predetermined percentage of the IP addresses that map to the unknown domain name are in the approved IP address list, designate the unknown domain name as approved and assigning the unknown domain name to the approved domain name list; and in response to a determination that less than or equal to the predetermined percentage of the IP addresses that map to the unknown domain name are in the approved IP address list, designate the unknown domain name as disapproved and assigning the unknown domain name to the disapproved domain name list.

10. The non-transitory machine-readable storage medium of claim 8, wherein the instructions further cause the computing device to:

assign a confidence interval to the designation of the unknown IP address as approved or disapproved;

determine if the confidence interval is greater than a predetermined confidence interval threshold;

in response to a determination that the confidence interval is greater than the predetermined confidence interval threshold, designate the unknown IP address as unknown; and in response to a determination that the confidence interval is less than or equal to the predetermined confidence interval threshold, designate the unknown IP address as approved or disapproved based on the determination that more than, or less than or equal to, the predetermined percentage of the domain names that map to the unknown IP address are in the approved domain name list.

11. The non-transitory machine-readable storage medium of claim 9, wherein the instructions further cause the computing device to:

assign a confidence interval to the designation of the unknown domain name as approved or disapproved;

determine if the confidence interval is greater than a predetermined confidence interval threshold;

in response to a determination that the confidence interval is greater than the predetermined confidence interval threshold, designate the unknown domain name as unknown; and in response to a determination that the confidence interval is less than or equal to the predetermined confidence interval threshold, designate the unknown domain name as approved or disapproved based on the determination that more than, or less than or equal to, the predetermined percentage of the IP addresses that map to the unknown domain name are in the approved IP address list.

12. The non-transitory machine-readable storage medium of claim 8, wherein the instructions further cause the computing device, when determining if more than a predetermined percentage of the domain names that map to the unknown IP address are in the approved domain name list further, to:

compute an adjusted fraction related to the domain names that map to the unknown IP address by:
  account for a total number of the received plurality of domain names, and
  account for an average of all fractions of nodes of a bipartite graph used to represent the mapping of the received plurality of domain names to the received plurality of IP addresses; and
compare the computed adjusted fraction to a threshold to determine whether the unknown IP address is designated as approved or as disapproved.

13. The non-transitory machine-readable storage medium of claim 8, wherein the instructions further cause the computing device, when determining if more than a predetermined percentage of the IP addresses that map to the unknown domain name are in the approved IP address list, to:

compute an adjusted fraction related to the IP addresses that map to the unknown domain name by:
  accounting for a total number of the received plurality of IP addresses, and
  accounting for an average of all fractions of nodes of a bipartite graph used to represent the mapping of the received plurality of domain names to the received plurality of IP addresses; and compare the computed adjusted fraction to a threshold to determine whether the unknown domain name is designated as approved or as disapproved.

14. The non-transitory machine-readable storage medium of claim 8, wherein the instructions further cause the computing device to:

mark a time associated with the receiving of the plurality of domain names and the receiving of the plurality of IP addresses;

determine if the time associated with the receiving of the plurality of domain names and the receiving of the plurality of IP addresses exceeds a predetermined time interval based on a current time;

in response to a determination that the time associated with the receiving of the plurality of domain names and the receiving of the plurality of IP addresses exceeds the predetermined time interval based on the current time, update the mapping of the received plurality of domain names to the received plurality of IP addresses; and in response to a determination that the time associated with the receiving of the plurality of domain names and the receiving of the plurality of IP addresses is less than or equal to the predetermined time interval based on the current time, wait for the time associated with the receiving of the plurality of domain names and the receiving of the plurality of IP addresses to exceed the predetermined time interval before updating the mapping of the received plurality of domain names to the received plurality of IP addresses.

* * * * *